United States Patent [19]

Plog et al.

[11] Patent Number: 5,674,460
[45] Date of Patent: Oct. 7, 1997

[54] REACTOR FOR THE CATALYTIC REMOVAL OF CO IN HIGH-$H_2$ GAS

[75] Inventors: Carsten Plog; Werner Maunz, both of Markdorf; Thomas Stengel, Friedrichshafen; Renato Andorf, Meckenbeuren, all of Germany

[73] Assignee: Daimler-Benz AG, Germany

[21] Appl. No.: 323,216

[22] Filed: Oct. 14, 1994

[30] Foreign Application Priority Data

Oct. 14, 1993 [DE] Germany .......................... 43 34 981.1

[51] Int. Cl.[6] .................................................. B01D 53/38
[52] U.S. Cl. .......................... 422/177; 422/171; 422/190; 422/211; 422/220; 422/224
[58] Field of Search ........................ 422/171, 177, 422/190, 211, 220, 224

[56] References Cited

U.S. PATENT DOCUMENTS

| | | | |
|---|---|---|---|
| 4,213,766 | 7/1980 | Wyatt | 422/220 |
| 4,753,780 | 6/1988 | Bowen | 422/224 |
| 4,971,768 | 11/1990 | Ealba et al. | 422/220 |
| 5,110,560 | 5/1992 | Presz, Jr. et al. | 422/220 |
| 5,248,485 | 9/1993 | Lilja et al. | 422/224 |
| 5,350,566 | 9/1994 | Stringano | 422/224 |
| 5,399,324 | 3/1995 | Subramanian et al. | 422/177 |

FOREIGN PATENT DOCUMENTS 0 432 364A1  6/1991  European Pat. Off. .

*Primary Examiner*—Timothy McMahon
*Attorney, Agent, or Firm*—Evenson, McKeown, Edwards & Lenahan P.L.L.C.

[57] ABSTRACT

This invention relates to a reactor for the selective catalytic removal of CO in high $H_2$ gas. A precious-metal-containing selective CO oxidation catalyst is applied to a metallic or ceramic carrier having a cross channel or other structure which causes a turbulent fluid flow within the reactor.

19 Claims, 5 Drawing Sheets

REACTOR FOR THE CATALYTIC REMOVAL OF CO IN HIGH-H₂ GAS

BACKGROUND AND SUMMARY OF THE INVENTION

This invention relates to a reactor for the selective catalytic removal of CO in gasses having a high concentration of $H_2$. A reactor of this type is used, for example, for the removal of CO from the waste gas of a reformer in order to prepare the waste gas as a reaction substance for a fuel cell.

SUMMARY OF THE INVENTION

In the art, the catalytic oxidation of CO in a high-$H_2$ atmosphere is usually carried out in fixed-bed reactors on selective precious metal contacts by the injection of oxygen or air. In this case, the catalyst is present in the form pellets or balls in bulk form in the reaction pipe. Tests carried out by the applicant concerning the applicability of selective CO-oxidation for the removal of CO from the exhaust gas of the $CH_3OH$-reformer show that the occurring substance and heat transport resistances result in a reduced selectivity of the CO-oxidation, and steep temperature gradients in the reactor. On the whole, this means a reduction of the amount of $H_2$ available for the fuel cell and an increase of the CO level at the electrode.

It is therefore an object of the invention to provide a reactor which achieves increased selectivity of the CO-oxidation and, at the same time, avoids steep temperature gradients within the reactor.

This object is achieved by the reactor according to the invention, in which the reactor comprises a structure having a shape and construction which causes a turbulent flow and promotes the heat transport within the reactor. The precious-metal-containing selective CO oxidation catalyst is coated on this structure.

Fluid flow and heat transport resistances which occur in a fixed-bed reactor are reduced by the turbulent flow generated in the structure under defined reaction conditions. As a result, higher CO conversions and uniform temperature courses can be achieved in the reactor. Furthermore, the dynamic response of the reactor to changes of the operating conditions can be improved significantly.

The structure according to the invention (particularly, a three-dimensional structure) may be in the form of a carrier structure, such as a metallic or ceramic cross channel structure, which is contained in the reactor. However, it is also possible to construct the reactor wall itself as a turbulence-generating and heat-transport-promoting structure. Likewise, metallic or ceramic sponge or fiber structures may be used as catalyst carriers. In this case, the porosity of structures of this type must be selected so as not to exceed the maximally permissible pressure drop.

The reactor according to the invention is particularly suitable for use in non-stationary conditions, such as occur when fuel cells are used in passenger cars and commercial vehicles. It may also be utilized, for example, for current generating aggregates for which fuel cells are used.

The selective oxidation on the CO oxidation catalyst takes place according to the following reaction:

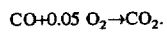

$$CO + 0.05\ O_2 \rightarrow CO_2.$$

Depending on the working temperatures, the following precious-metal-containing, selective CO-oxidation catalysts are advantageously used:

90°–120°:
Pt/Al₂O₃, Ru/Al₂O₃
particularly:
Pt (x ma-%)/Al₂O₃ with $1 \leq x \leq 7$
Pt (5 ma-%)/Al₂O₃
Ru (0.44 ma-%)/Al₂O₃
140°–160°:
Pt/Al₂O₃, particularly: PT(0.3 ma-%)/Al₂O₃
200°–230°:
Pt-zeolite, particularly Pt(1 ma-%)NaY.

The heat and substance transport characteristics of metallic cross channel structures which are known per se (see, for example, company brochure of Sulzer Co.) are combined with the selective characteristics of the precious-metal-containing oxidation catalyst.

Cross channel structures are made of metal foils or layers which are corrugated, serrated or shaped in a similar manner and which are placed above one another. The areas of the "wave loops" on both sides of the foils or layers are used as flow channels. The individual layers are positioned above one another so that the flow channels of adjacent layers enclose sun angle of between 0° and 90° (preferably 90°) with respect to one another. Furthermore, the flow channels should extend at an angle of between 0° and 90° (preferably of 45°) with respect to the longitudinal axis of the reactor.

The following is a description of the application of the catalyst on the metal honeycomb body with a cross channel structure on the basis of the Pt/Al₂O₃ catalyst. The Pt(5 ma-%)Al₂O₃ used in this case is a saturation catalyst in powder form which is commercially available. The platinum is elementally present on the aluminum oxide which is used as the carrier material. In the condition at the time of supply, the powder has a median grain size of approximately 60 μm which is reduced by a grinding operation (see below) to 3 μm. The BET-surface of the catalyst is approximately 140 m²/g.

For pretreatment, the cross channel carrier is annealed for several hours in air so that the resulting structure of the carrier surface is adapted to the dimension of the catalyst powder. Before the coating operation, the Pt(5 ma-%)/Al₂O₃ catalyst powder is ground in an aqueous suspension. Subsequently, binding agents are added to the suspension, which is topped-up with water so that a defined concentration of solids will be present. The pretreated metal carrier is then immersed in the catalyst suspension. After immersion, the channels of the carrier are blown clear and the carrier is dried. The immersing operation with the subsequent drying will be repeated until the required application mass has been achieved. Finally, the coated metal carrier will be calcined.

Other objects, advantages and novel features of the present invention will become apparent from the following detailed description of the invention when considered in conjunction with the accompanying drawings.

DETAILED DESCRIPTION OF THE DRAWINGS

Figure 1:
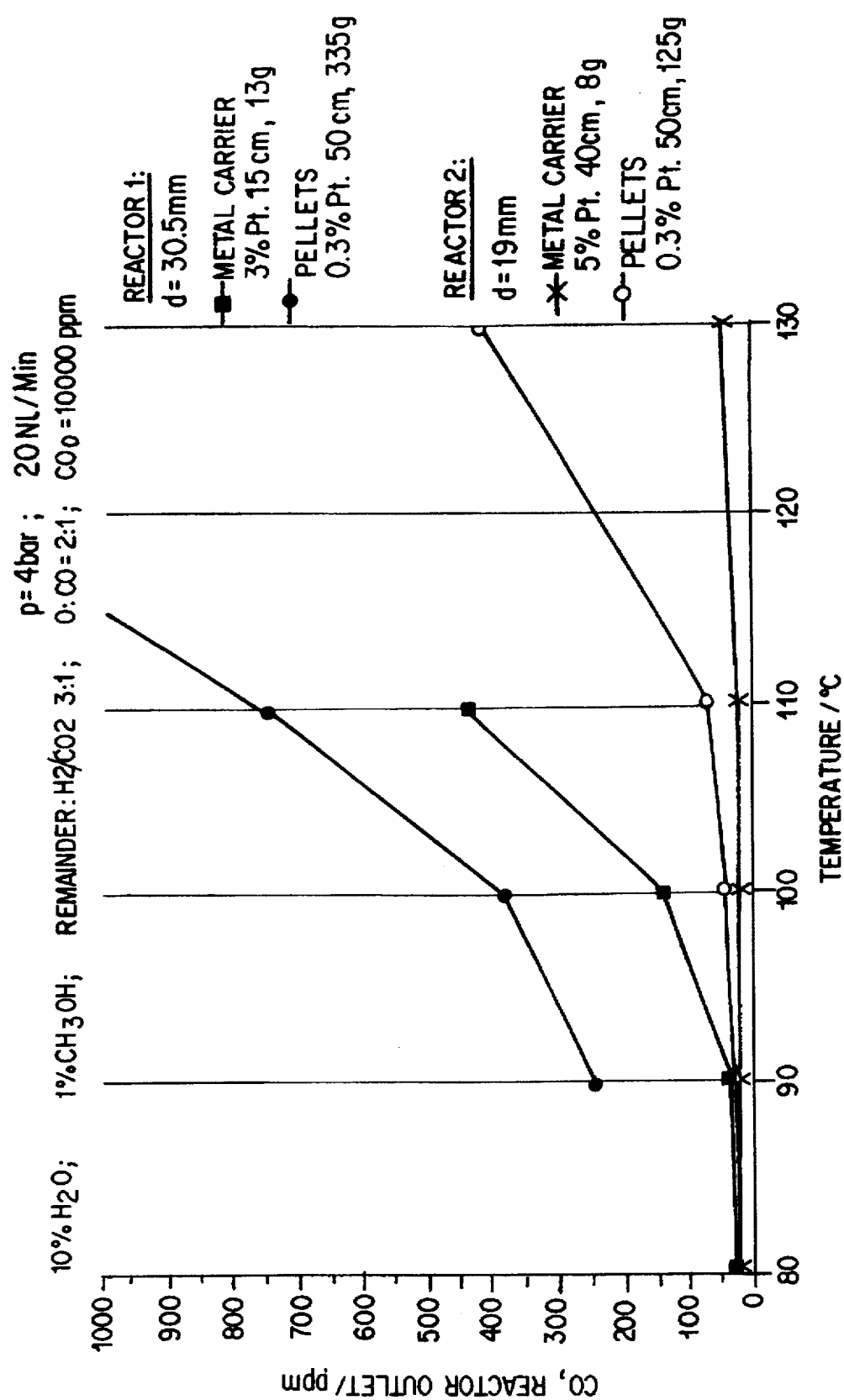
FIG. 1 is a diagram showing the CO outlet concentrations obtained in experiments.

As an example, FIG. 1 shows a comparison of the achieved CO outlet concentrations (ordinate) in the temperature range from 80° C. to 130° C. (abscissa) in a fixed-bed reactor (circular measuring points) and on metal carriers having a cross channel structure (measuring points as a cross or square) for differing reactor diameters. The layer height of the cross channel structure was 3.0 mm. $Pt/Al_2O_3$ in different Pt concentrations was used as the catalyst. The CO inlet concentration amounted to 10,000 ppm respectively. In addition to the CO and the air, the inlet gas had the following composition: 10% $H_2O$, 1% $CH_3OH$, remainder $H_2/CO_2$ at the ratio of 3:1. The illustrated results indicate that, in the case of a given reactor diameter, lower CO outlet concentrations are achieved than in a fixed-bed reactor by using the metal carriers. For example, when the above-mentioned metal carriers are used in a reactor having a diameter of 19 mm, the CO concentration in the above-mentioned temperature range can be lowered from 10,000 to below 40 ppm.

Figure 2:
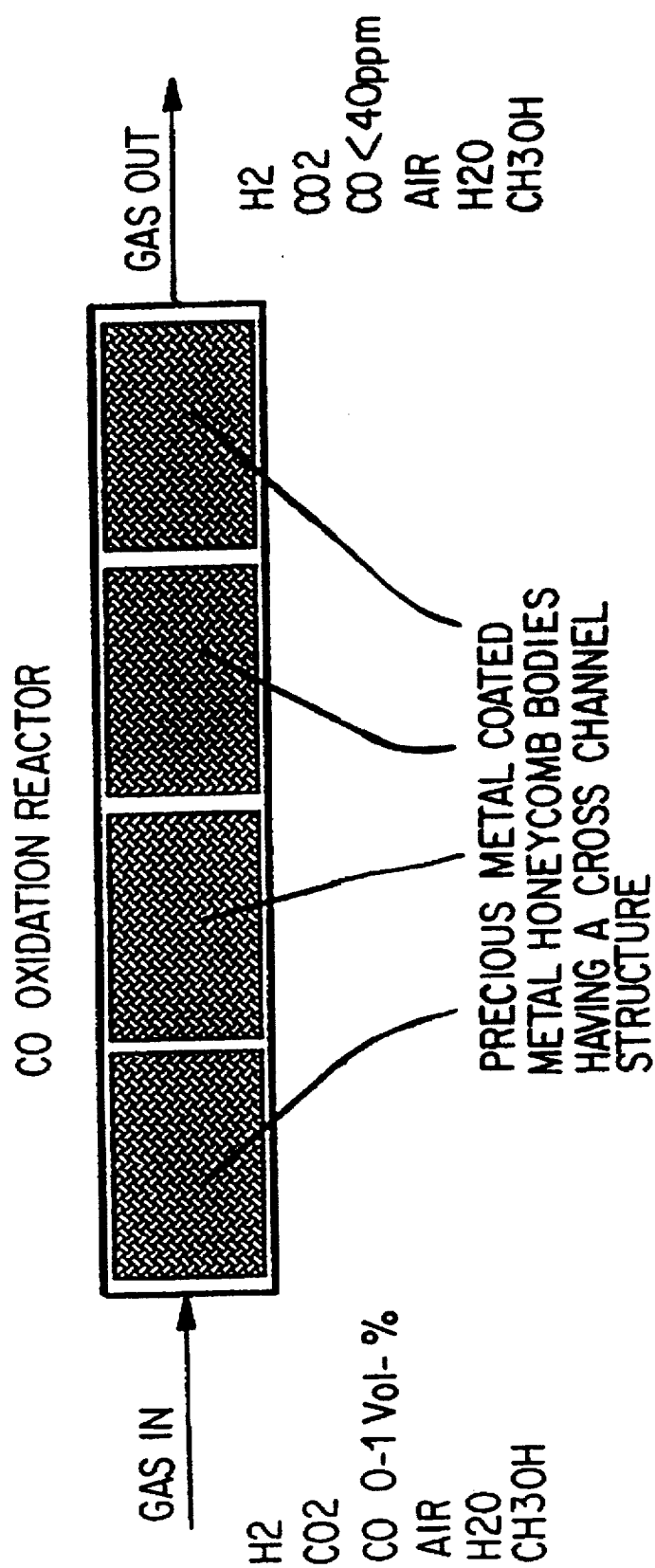
FIG. 2 is a schematic representation of the reactor according to the invention.

FIG. 2 is a schematic diagram which shows the process of selective CO oxidation by means of the reactor according to the invention. In this example, waste gas from a $CH_3OH$ reformer, which may contain up to 1% by volume CO, is led to the reactor. The metal honeycomb bodies having the cross channel structure coated with the precious-metal-containing selective catalyst are situated in the reactor. On the catalyst, the CO is oxidized to $CO_2$, so that the CO concentration of the gas emerging from the reactor amounts to less than 40 ppm.

Figure 3:
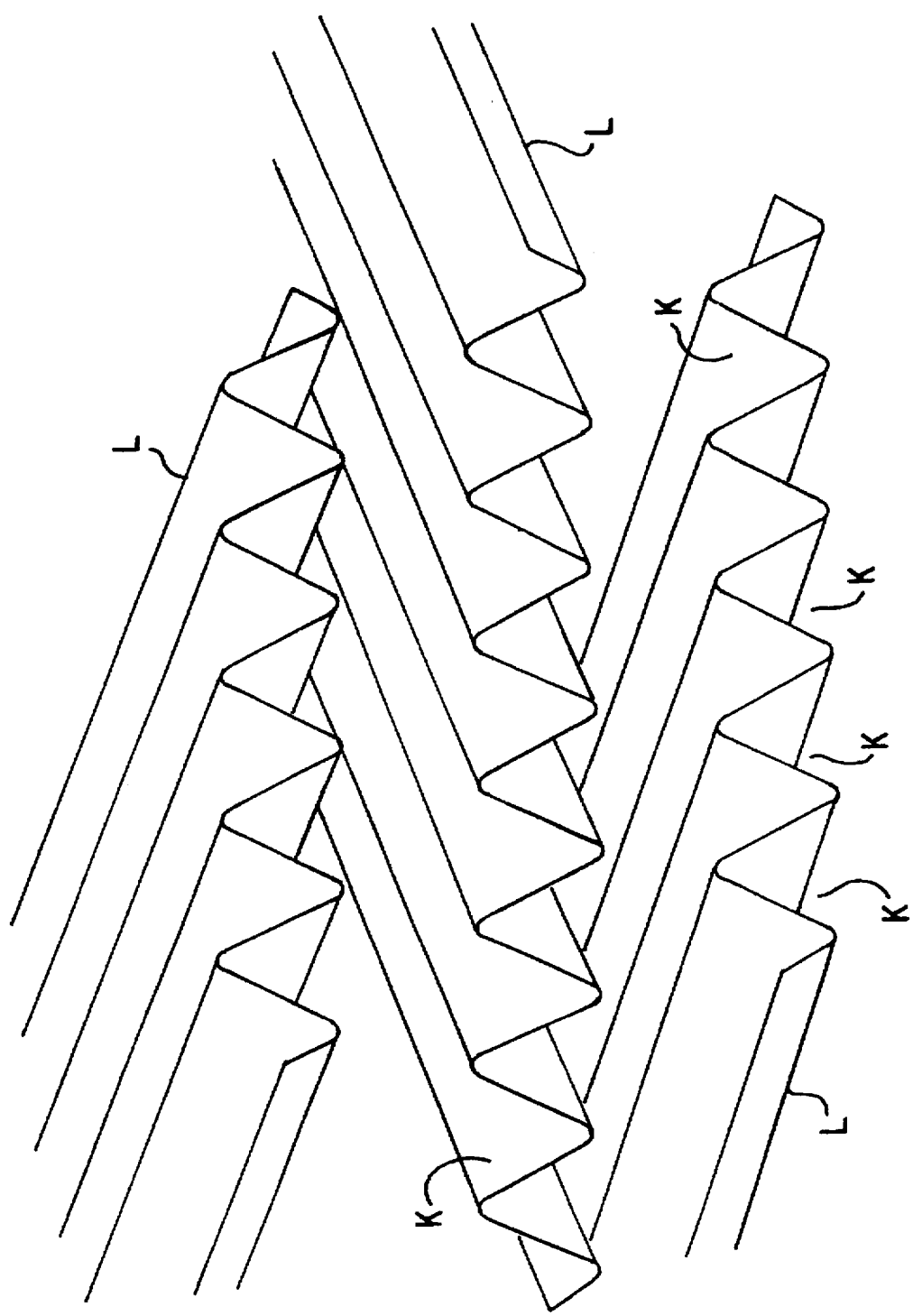
FIG. 3 is a perspective view of a metal honeycomb body having a cross channel structure.

FIG. 3 shows an example of a cross channel carrier with serrated or corrugated metal foils L. The recessed volume areas on the left and on the right of a foil L respectively form flow channels K. The individual layers are arranged above one another in such a manner that the flow channels enclose a defined angle of between 0° and 90° with one another. (In the drawing, this angle is shown as approximately 90°.) In order to increase clarity, the individual sheets are shown spaced away from one another; however, in reality, they are sandwiched directly on one another.

Figure 4A:
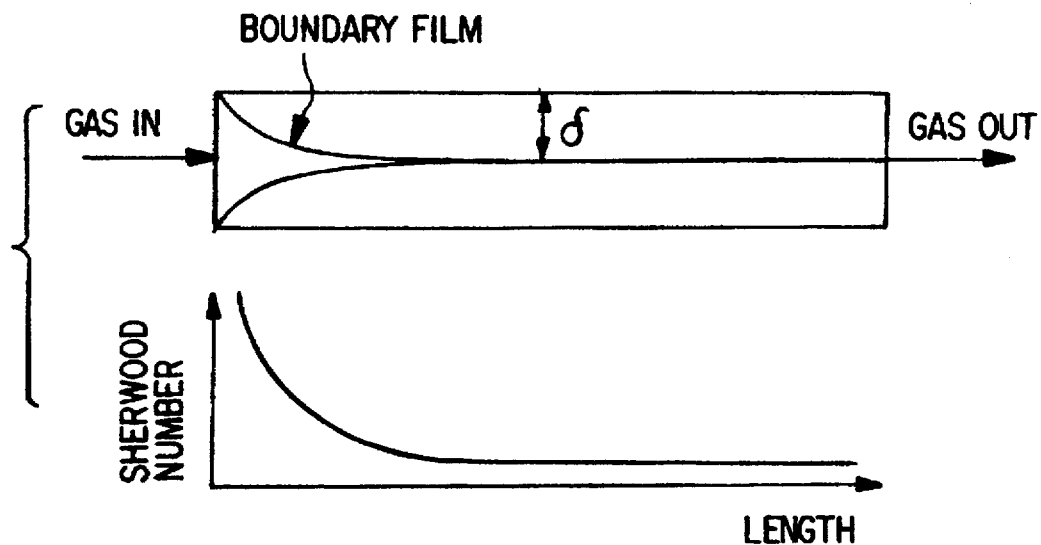
FIGS. 4a and b show the formation of the boundary film in pipes through which gas flows, and which have a smooth and a structured interior pipe wall.
Figure 4B:
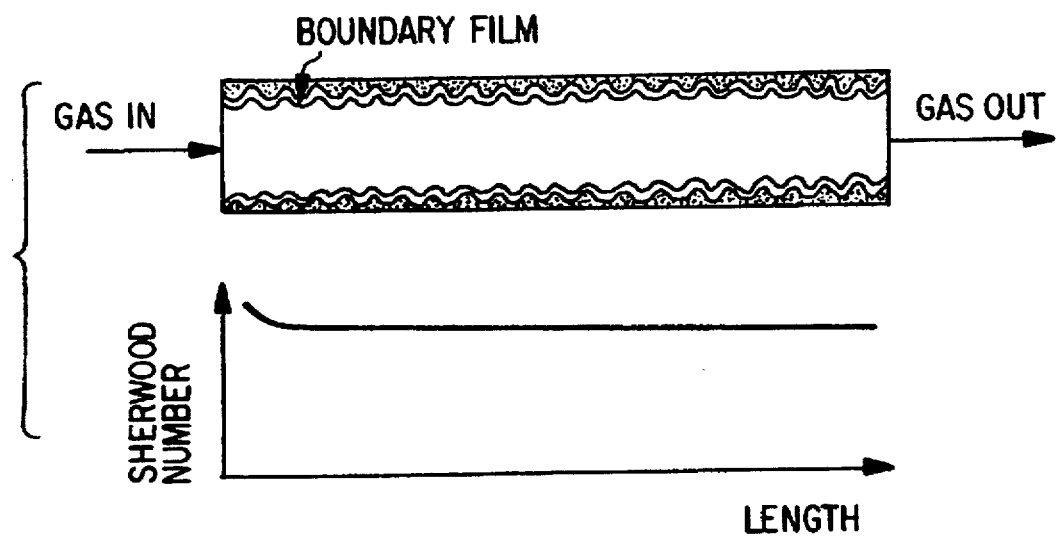

FIGS. 4a and 4b illustrate the formation of the boundary film in a pipe through which gas flows and which has a smooth interior pipe wall in comparison to a pipe having a structured interior pipe wall. In the case of the smooth interior pipe wall (FIG. 4a), a thick boundary film is formed which results in a considerably reduced substance transport to the catalytically coated reactor wall. When the pipe wall is structured (FIG. 4b), the boundary film, as a result of the flow turbulence generated on the wall, remains uniformly thin along the whole length of the reactor and therefore causes a good mass transfer. The Sherwood Numbers, which are entered for both cases and which are used as a measurement of the mass transfer, illustrate the different mass transfer characteristics of the two reactors.

Figure 5B:
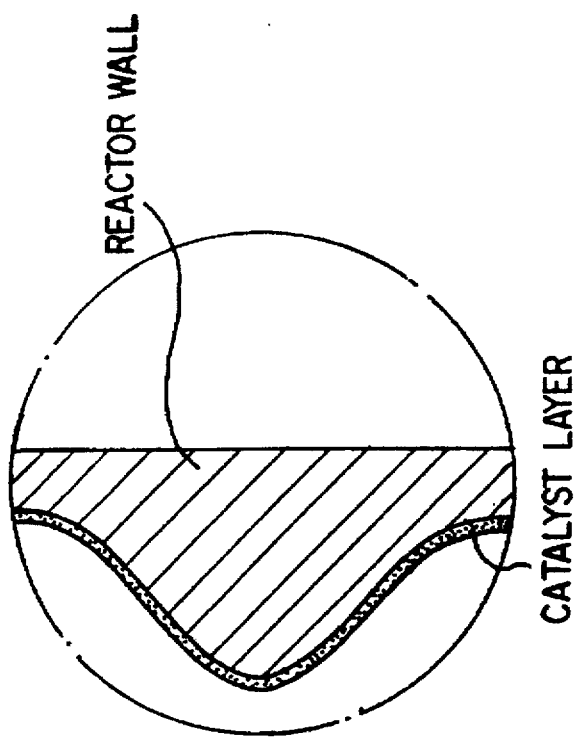
FIG. 5 is a view of the reactor having a structured interior pipe wall.
Figure 5A:
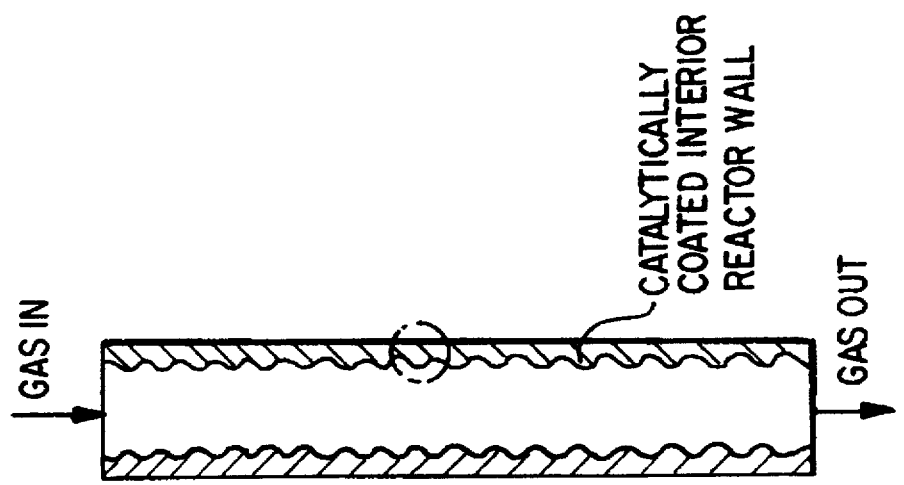

As an example, FIG. 5 shows a reactor having a structured interior pipe wall to which a catalytic coating is applied. The corrugated structure of the wall prevents the formation of a thick boundary film, and therefore increases the mass transfer to the catalytically active layer.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Reactor apparatus for catalytic removal of CO in high-$H_2$ gas, comprising:

means for generating a turbulent fluid flow within said reactor apparatus, said means comprising a three dimensional structure arranged within a gas flow path of said reactor apparatus; and a precious metal-containing CO oxidation catalyst coated on said structure.

2. Reactor apparatus according to claim 1 wherein the three dimensional structure is a carrier having a cross channel structure, said carrier being made from a material selected from the group consisting of: a metal and a ceramic.

3. Reactor apparatus according to claim 1 wherein the structure is a carrier having a sponge or fiber structure, said carrier being made from a material selected from the group consisting of: a metal and a ceramic.

4. Reactor apparatus according to claim 1 wherein the structure is formed by the reactor wall.

5. Reactor apparatus according to claim 2 wherein the structure is formed by the reactor wall.

6. Reactor apparatus according to claim 3 wherein the structure is formed by the reactor wall.

7. Reactor apparatus according to claim 2 wherein the surface structure of the carrier is adapted to the dimension of a catalyst powder contained in said catalyst coated thereon.

8. Reactor apparatus according to claim 4 wherein the surface structure of the reactor wall is adapted to the dimension of a catalyst powder contained in said catalyst coated thereon.

9. Reactor apparatus according to claim 1 wherein that the layer thickness of the CO oxidation is selected based on CO inlet concentration.

10. Reactor apparatus according to claim 4 wherein that the layer thickness of the CO oxidation is selected based on CO inlet concentration.

11. Reactor apparatus according to claim 1 wherein the CO oxidation catalyst is $Pt/Al_2O_3$.

12. Reactor apparatus according to claim 2 wherein the CO oxidation catalyst is $Pt/Al_2O_3$.

13. Reactor apparatus according to claim 3 wherein the CO oxidation catalyst is $Pt/Al_2O_3$.

14. Reactor apparatus according to claim 12 wherein Pt clusters of the catalyst have a size ranging from 3 to 10 nm.

15. Reactor apparatus according to claim 1 wherein the CO oxidation catalyst is selected from the group consisting of $Ru/Al_2O_3$ and Pt zeolite.

16. Reactor apparatus according to claim 2 wherein the CO oxidation catalyst is selected from the group consisting of $Ru/Al_2O_3$ and Pt zeolite.

17. Reactor apparatus according to claim 3 wherein the CO oxidation catalyst is selected from the group consisting of $Ru/Al_2O_3$ and Pt zeolite.

18. Reactor apparatus according to claim 4 wherein the CO oxidation catalyst is selected from the group consisting of $Ru/Al_2O_3$ and Pt zeolite.

19. Reactor apparatus according to claim 1 wherein said CO oxidation catalyst reacts with CO at a rate which is substantially greater than a rate at which said CO oxidation catalyst reacts with $H_2$, at an operating temperature of said apparatus.

* * * * *